US012809895B2

(12) United States Patent
Ezrielev et al.

(10) Patent No.: US 12,809,895 B2
(45) Date of Patent: Nov. 24, 2026

(54) MANAGEMENT OF CONTEXT DATA RETRIEVAL USING TIERED DATA SOURCES

(71) Applicant: Dell Products L.P., Round Rock, TX (US)

(72) Inventors: Ofir Ezrielev, Be'er Sheva (IL); Lev Makler, Be'er Sheva (IL); Yehonatan Cohen, Ashdod (IL)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 19/034,867

(22) Filed: Jan. 23, 2025

(65) Prior Publication Data

US 2026/0211918 A1 Jul. 23, 2026

(51) Int. Cl.
*G06F 16/334* (2025.01)
*G06F 16/36* (2019.01)

(52) U.S. Cl.
CPC .......... *G06F 16/334* (2019.01); *G06F 16/367* (2019.01)

(58) Field of Classification Search
CPC ............................. G06F 16/367; G06F 16/334
See application file for complete search history.

(56) References Cited

U.S. PATENT DOCUMENTS

| | | | |
|---|---|---|---|
| 10,664,527 | B1 | 5/2020 | Henderson et al. |
| 11,347,783 | B2 | 5/2022 | Kraus et al. |
| 11,405,457 | B2 | 8/2022 | Ding |
| 11,972,223 | B1 | 4/2024 | DeFoor |
| 12,019,683 | B1 | 6/2024 | Newman |
| 12,106,049 | B1 | 10/2024 | Abi-Akl |
| 12,254,272 | B1 | 3/2025 | Cetoli |
| 12,353,469 | B1 | 7/2025 | Mahabadi |
| 12,511,324 | B1 | 12/2025 | Kveler |

(Continued)

OTHER PUBLICATIONS

Nguyen et al. (Sep. 5, 2024). "An Ontology-based-RAG System using Graph for accurate analytics—A dynamic way to combine information from documents with structured data to drive insights using AGE". Medium. Max.AI Tech Blog. Retrieved from <https://medium.com/max-ai-tech-blog/building-a-graph-based-rag-system-using-apache-age-98e0ac7f9589#:~:text=This%20is%20where%20Ontology%2Dbased,the%20ontology%20and%20data%20grow> on Jan. 28, 2025 (9 pages).

(Continued)

*Primary Examiner* — Brittany N Allen
(74) *Attorney, Agent, or Firm* — WOMBLE BOND DICKINSON (US) LLP

(57) ABSTRACT

Methods and systems for managing operation of a data processing system are disclosed. A prompt may be obtained for processing using a trained generative machine-learning model. Instances of ontology terms that are present in the prompt may be identified to obtain an ontology term set and a first retrieval process for the prompt may be performed to obtain first context data from a primary tier of a knowledge data source. If the first context data does not meet sufficiency criteria specifying a minimum level of coverage of the ontology term set by content of the first context data, then a second retrieval process for the prompt may be performed to obtain second context data from a secondary tier of the knowledge data source. A response may be obtained from the trained generative machine-learning model using the prompt, the first context data, and the second context data.

20 Claims, 7 Drawing Sheets

(56) References Cited

U.S. PATENT DOCUMENTS

| | | | | |
|---|---|---|---|---|
| 12,530,392 | B1 * | 1/2026 | Trim | G06F 16/2237 |
| 12,664,157 | B1 * | 6/2026 | Seshadri | G06F 16/2438 |
| 2006/0085423 | A1 | 4/2006 | Barsness | |
| 2016/0203193 | A1 | 7/2016 | Haverlock | |
| 2016/0321617 | A1 | 11/2016 | Shastri | |
| 2021/0034657 | A1 | 2/2021 | Kale | |
| 2021/0081613 | A1 | 3/2021 | Begun | |
| 2021/0295822 | A1 | 9/2021 | Tomkins | |
| 2021/0406977 | A1 | 12/2021 | Ramachandran | |
| 2023/0082381 | A1 | 3/2023 | Gnanasambandam | |
| 2024/0086489 | A1 | 3/2024 | Sachindran | |
| 2024/0265041 | A1 | 8/2024 | Rennie | |
| 2024/0289863 | A1 | 8/2024 | Smith Lewis | |
| 2024/0320476 | A1 | 9/2024 | Chandrasekaran | |
| 2024/0403341 | A1 | 12/2024 | Berglund | |
| 2025/0029171 | A1 | 1/2025 | Unnikrishnan | |
| 2025/0069086 | A1 | 2/2025 | Sotiriou | |
| 2025/0094707 | A1 | 3/2025 | Portisch | |
| 2025/0139140 | A1 * | 5/2025 | Gopalan | G06F 16/3329 |
| 2025/0181321 | A1 | 6/2025 | Gormley | |
| 2025/0190454 | A1 | 6/2025 | Patil | |
| 2025/0200090 | A1 | 6/2025 | Beringer | |
| 2025/0209156 | A1 | 6/2025 | Sankaran | |
| 2025/0259005 | A1 * | 8/2025 | Du | G06F 16/24522 |
| 2025/0265276 | A1 | 8/2025 | Yadav | |
| 2025/0335479 | A1 * | 10/2025 | Dinh | G06F 16/3329 |
| 2025/0363142 | A1 | 11/2025 | Madisetti | |
| 2025/0363345 | A1 | 11/2025 | Brown | |
| 2025/0371004 | A1 * | 12/2025 | Chen | G06F 16/24542 |

OTHER PUBLICATIONS

Toro et al. (Dec. 18, 2023). "Dynamic Retrieval Augmented Generation of Ontologies using Artificial Intelligence (DRAGON-AI)". arXiv:2312.10904. Retrieved from <https://arxiv.org/abs/2312.10904> on Jan. 28, 2025 (31 pages).

Kommineni et al. (Mar. 13, 2024). "From human experts to machines: An LLM supported approach to ontology and knowledge graph construction". arXiv:2403.08345v1. Retrieved from <https://arxiv.org/pdf/2403.08345v1> on Jan. 28, 2025 (10 pages).

Barron et al. (Oct. 3, 2024). "Domain-Specific Retrieval-Augmented Generation Using Vector Stores, Knowledge Graphs, and Tensor Factorization". arXiv:2410.02721. Retrieved from <https://arxiv.org/pdf/2410.02721> on Jan. 28, 2025 (8 pages).

Palantir. (n.d.) "Ontology building/Ontology Manager/Overview". Retrieved from <https://www.palantir.com/docs/foundry/ontology-manager/overview> on Jan. 28, 2025 (10 pages).

Mousavi et al. (Oct. 2, 2024). "DyKnow: Dynamically Verifying Time-Sensitive Factual Knowledge in LLMs". arXiv:2404.08700. Retrieved from <https://arxiv.org/pdf/2404.08700> on Jan. 28, 2025 (16 pages).

Huang et al. (Nov. 30, 2023). "VTimeLLM: Empower LLM to Grasp Video Moments". arXiv:2311.18445. Retrieved from <https://arxiv.org/pdf/2311.18445> on Jan. 28, 2025 (14 pages).

Steve Tueno. (Sep. 23, 2024). "Natural Language Query Engine for Relational Databases using Generative AI". arXiv:2410.07144v1. Retrieved from <https://arxiv.org/pdf/2410.07144> on Jan. 28, 2025 (18 pages).

Jaime Hernández. (Aug. 15, 2024). "Enhancing SQL Query Generation with Large Language Models (LLMs): My Learning Journey". Medium. Retrieved from <https://devjaime.medium.com/enhancing-sql-query-generation-with-large-language-models-llms-my-learning-journey-81f116646314> on Jan. 28, 2025 (4 pages).

Michiardi et al. (May 22, 2018). "Cache-based Multi-query Optimization for Data-intensive Scalable Computing Frameworks". arXiv:1805.08650. Retrieved from <https://arxiv.org/pdf/1805.08650> on Jan. 28, 2025 (14 pages).

Khodak et al. (May 2, 2024). "Learning to Relax: Setting Solver Parameters Across a Sequence of Linear System Instances". arXiv:2310.02246. Retrieved from <https://arxiv.org/pdf/2310.02246> on Jan. 28, 2025 (33 pages).

Niels de Jong (Jul. 13, 2023). "NeoDash 2.3—Create Graph Dashboards With LLM-Powered Natural Language Queries". Medium. Neo4j Developer Blog. Retrieved from <https://medium.com/neo4j/neodash-2-3-create-graph-dashboards-with-llm-powered-natural-language-queries-348cf4dec583> on Jan. 28, 2025 (7 pages).

Li et al. (Feb. 1, 2024). "PAP-REC: Personalized Automatic Prompt for Recommendation Language Model". arXiv:2402.00284v1. Retrieved from <https://arxiv.org/pdf/2402.00284> on Jan. 28, 2025 (24 pages).

Malak et al. (May 14, 2024). "Multi-Server Multi-Function Distributed Computation". arXiv:2405.08732. Retrieved from <https://arxiv.org/pdf/2405.08732> on Jan. 28, 2025 (28 pages).

Informatica. (Apr. 2021). "Creating an Automatic Relational Database Subscription". Retrieved from <https://docs.informatica.com/data-integration/data-integration-hub/10-5/getting-started/creating-subscriptions/creating-an- automatic-relational-database-subscription.html> on Jan. 28, 2025 (2 pages).

Choudhary, Kaushal, "Efficient RAG with Compression and Filtering", Jan. 9, 2024, http://medium.com/etoai/enhance-rag-integrate-contextual-compression-and-filtering-for-precision-a29d4a810301 (14 pages).

* cited by examiner

MANAGEMENT OF CONTEXT DATA RETRIEVAL USING TIERED DATA SOURCES

FIELD

Embodiments disclosed herein relate generally to managing data processing systems. More particularly, embodiments disclosed herein relate to systems and methods to manage operation of the data processing systems using inference models.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
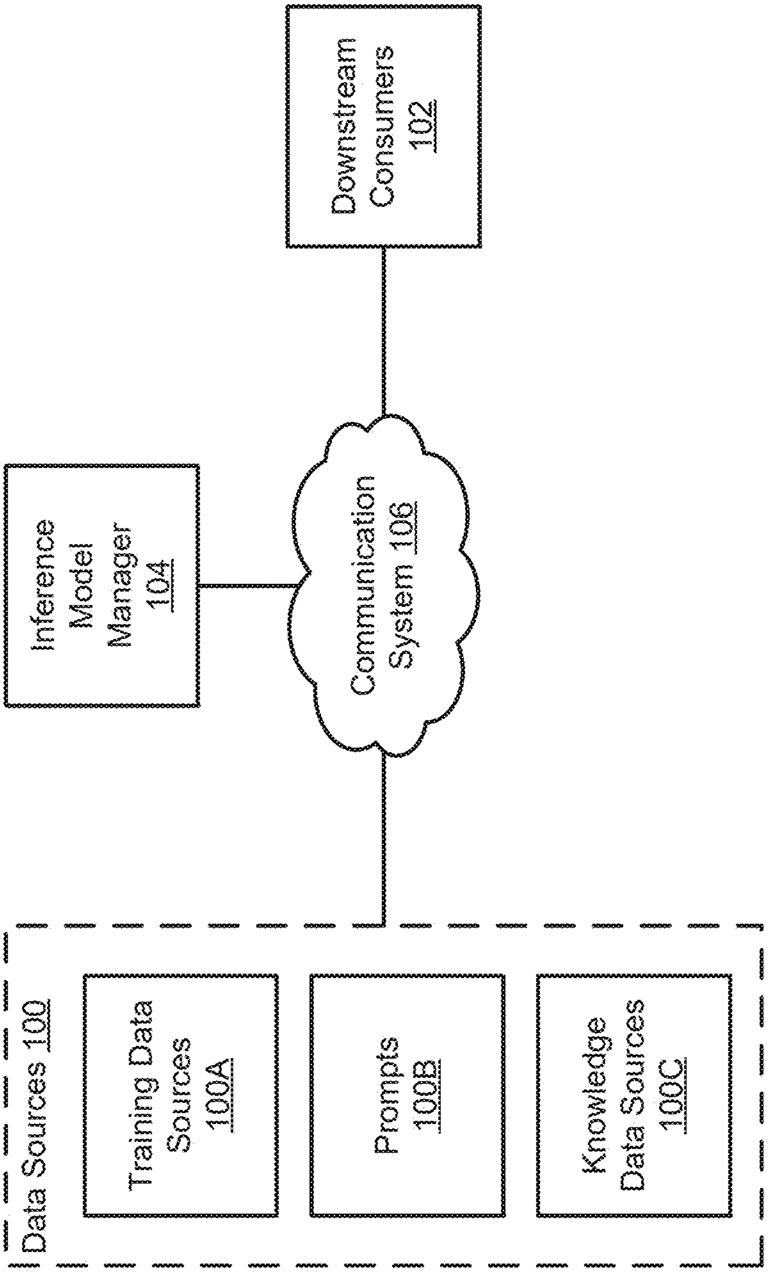
FIG. 1 shows a block diagram illustrating a distributed system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing operation of data processing systems that may provide computer-implemented services. The computer-implemented services may be provided using inference models (e.g., artificial intelligence models). The inference models may be used to generate inferences regarding operation of the data processing systems, and the inferences may be used in downstream processes to increase a likelihood of desired operation of the data processing systems. For example, the inference models may be trained to infer information regarding occurrences of security events (e.g., security threats) to the data processing systems based on ingest data, and the operation of the data processing systems may be updated to mitigate (e.g., prevent) negative outcomes associated with the security events.

However, a quality (e.g., reliability) of the inferences used to manage the operation of the data processing systems may depend on a quality (e.g., informational content) of the ingest data provided to the (trained) inference models to obtain the inferences. For example, the ingest data may include a prompt (e.g., input from a downstream consumer of the inferences). If the informational content of the prompt is limited and/or ambiguous, then the ingest data to the inference model may be inadequate for generating an inference of expected quality.

To increase a likelihood of generating an inference of expected quality, a retrieval-augmented generation process may be implemented. During the retrieval-augmented generation process, context data (e.g., additional information regarding terms such as words and/or phrases in the prompt) may be retrieved from a trusted knowledge base during a retrieval process. The context data may then be used to increase the informational content of the ingest data provided to the inference models to generate the inference. However, due to limitations of the retrieval process, the context data may be insufficient to generate expected quality ingest data (e.g., ingest data with adequate informational content). For example, meaningful terms present in the prompt for which additional context is required may not be identified and/or sufficient context data may not be obtained for each identified term in the prompt.

Thus, to increase a likelihood of providing expected quality ingest data to the inference models, a first retrieval process for the prompt may be performed to obtain a first portion of context data from a primary tier of the knowledge data source. To do so, an ontology for use of the inference models may be defined. The ontology may include ontology definitions that specify a list of ontology terms (e.g., words and/or phrases) that have been designated as having a higher degree of meaning by an operator of the inference models than degrees of meaning of other terms. Each instance of the ontology terms present in the prompt may be identified to obtain an ontology term set, and the first portion of context data may be evaluated to determine whether the first context data meets sufficiency criteria with respect to the ontology term set. If the first context data does not meet the sufficiency criteria, a second retrieval process may be performed to obtain a second portion of context data from a secondary tier of the knowledge data source.

By doing so, context data obtained during retrieval processes may be more likely to be sufficient for improving a quality of the ingest data to the inference models, thereby improving a quality of the inferences used to manage operation of the data processing systems.

In an embodiment, a method for managing operation of a data processing system is provided. The method may include: obtain a prompt for processing using a trained generative machine-learning model; identifying instances of ontology terms that are present in the prompt to obtain an ontology term set, the ontology terms being part of ontology definitions; performing a first retrieval process for the prompt to obtain first context data from a primary tier of a knowledge data source, the first context data comprising chunks that are all classified as finalized and tagged with respect to the ontology definitions; making a determination regarding whether the first context data meets sufficiency criteria with respect to the ontology term set, the sufficiency criteria specifying a minimum level of coverage of the ontology term set by content of the first context data; and in a first instance of the determination where the first context data does not meet the sufficiency criteria: performing a second retrieval process for the prompt to obtain second context data from a secondary tier of the knowledge data source, the second context data comprising chunks that are all classified as non-finalized and tagged with respect to the ontology definitions; obtaining a response from the trained generative machine-learning model using the prompt, the first context data, and the second context data; and using the response to provision desired computer-implemented services.

Making the determination may include: for a first chunk of the first context data: identifying at least one tag applied to the first chunk, the at least one tag indicating at least one of the ontology terms is covered by the chunk; identifying whether the at least one of the ontology terms is linked by the ontology definitions as being equivalent to another of the ontology terms, and the first chunk not being tagged to indicate that the first chunk covers the other of the ontology terms; in a first instance of the identifying where the at least one of the ontology terms is linked as being equivalent to the other of the ontology terms: treating the first chunk as being tagged as covering both of: the at least one of the ontology terms, and the other of the ontology terms.

The method may also include: in a second instance of the determination where the first context data does meet the sufficiency criteria: obtaining the response from the trained generative machine-learning model using the prompt and the first context data; and using the response to provision desired computer-implemented services.

The ontology term set may include a deduplicated set of the instances of ontology terms.

The minimum level of coverage of the ontology term set by content of the first context data may specify a number of the chunks that must be tagged as covering each of the ontology terms of the ontology term sets.

The chunks that are all classified as finalized may be verified as being accurately tagged, and the chunks that are classified as non-finalized may not be verified as being accurately tagged.

The primary tier and the secondary tier may be logical demarcations of information stored in the knowledge data source.

An original query may be generated based on the prompt as part of the first retrieval process.

The original query may be serviced using a deterministic process, the deterministic process returning same results for repeated servicing of the original query.

The ontology terms may be words and/or phrases that have been designated as having a higher degree of meaning by an operator of the trained generative machine-learning model than other words and/or phrases not designated as having the higher degree of meaning by the operator.

A non-transitory media may include instructions that when executed by a processor cause the computer-implemented method to be performed.

A system may include the non-transitory media and a processor, and may perform the computer-implemented method when the computer instructions are executed by the processor.

Turning to FIG. 1, a block diagram illustrating a distributed system in accordance with an embodiment is shown. The system shown in FIG. 1 may provide computer-implemented services. The computer-implemented services may include any type and quantity of computer-implemented services. For example, the computer-implemented services may include communication services, data storage services, database services, data generation services, and/or any other type of service that may be implemented with a computing device.

The computer-implemented services may be provided by data processing systems to consumers of the computer-implemented services (e.g., users of the data processing systems, other data processing systems). To provide the computer-implemented services, operation of the data processing systems may be managed, for example, in accordance with policies (e.g., security policies, acceptable use policies). The policies may be enforced via updates to the operation of the data processing system over time to increase a likelihood of providing desired (e.g., secure, reliable) computer-implemented services.

The operation of the data processing system may be managed using artificial intelligence. For example, (trained) inference models may be used to assess, predict, and/or otherwise manage occurrences of events that may negatively impact provisioning of the computer-implemented services as desired, such as security events that may threaten the security of the data processing system (e.g., sensitive data accessible using the data processing systems).

To do so, an inference model such as a generative machine-learning model may be trained to generate a response to (e.g., an inference based on) ingest data. For example, the ingest data may include information regarding programs being executed by components of a data processing system, and the inference model may be trained to identify, based on the ingest data, a security threat to the data processing system and/or actions for managing the security threat. To manage the security threat, the inference may be provided to a downstream process during which operation of the data processing system may be updated in a manner that mitigates an undesired outcome of the security threat.

However, the responses obtained from the (trained) inference models may not be reliable for managing the operation of the data processing systems if informational content of the ingest data used during inferencing is inadequate. For example, terms (e.g., words and/or phrases) included in the prompt may be ambiguous and/or may have special meaning (e.g., a term may have different meaning to an operator of the inference models than a meaning based on its dictionary definition). Therefore, to increase a likelihood of generating reliable responses during inferencing, a retrieval-augmented generation process may be implemented to improve informational content of the ingest data to the inference models. To do so, the prompt may undergo preprocessing, during which context data may be obtained for terms present in the prompt.

For example, to obtain expected quality (e.g., adequate) ingest data, the prompt may be provided to a data pipeline. The data pipeline may include a retrieval process, during which terms in the prompt are identified, and context data for the identified terms is obtained. For example, the retrieval process may use methods to (i) identify terms present in the prompt that may require context data, (ii)

identify portions of context data from a trusted data source based on the identified terms, (iii) rank the identified portions of context data, and/or (iv) select a number of the ranked identified portions of context data for use as the context data.

However, due to limitations of these methods, not all terms that require context data may be identified and/or context data may not be obtained for all of the identified terms. Consequently, the context data may be insufficient for generating adequate ingest data. If the ingest data is inadequate, then a subsequent inferencing process that uses the inadequate ingest data may be likely to provide unreliable inferences, and outcomes of downstream processes (e.g., management processes for the data processing systems) that use the inferences may be undesirable.

In general, embodiments disclosed herein may provide methods, systems, and/or devices for managing operation of data processing systems using inference models in a manner that is more likely to result in desirable management outcomes. To do so, prompts for processing by the inference models may be preprocessed using a retrieval-augmented generation (RAG) process that retrieves context data until the context data meets sufficiency criteria. For example, a first retrieval process may be performed to retrieve first context data from a primary tier of a knowledge data source. The first context data may include chunks that may be all classified as finalized and tagged with respect to ontology definitions (e.g., defined by an operator of the inference models).

A determination may be made whether the first context data meets sufficiency criteria with respect to an ontology term set (e.g., instances of ontology terms that are present in the prompt). For example, the sufficiency criteria may specify a minimum level of coverage of the ontology term set by content of the first context data. If it is determined that the first context data does not meet the sufficiency criteria, a second retrieval process for the prompt may be performed to obtain second context data from a secondary tier of the knowledge data source. The second context data may include chunks that are all classified as non-finalized and tagged with respect to the ontology definitions. The retrieval process may be performed to obtain sufficient context data (e.g., first context data and/or second context data) for the ontology term set (e.g., each instance of ontology terms present in the prompt).

By doing so, the context data obtained during prompt preprocessing may be more likely to be sufficient for providing adequate ingest data to the inference models, thereby increasing a likelihood of the inferences being reliable for use in managing the operation of the data processing systems.

To provide the above-mentioned functionality, the distributed system of FIG. 1 may include data sources 100, downstream consumers 102, inference model manager 104, and communication system 106. The distributed system, any components thereof, and/or any other types of devices or components not shown in FIG. 1 may perform all, or a portion of the computer-implemented services independently and/or cooperatively. Each of these components is discussed below.

Data sources 100 may include any type and/or number of data sources. Each of data sources 100 may include hardware and/or software components configured to obtain data, store data, provide data to other entities, and/or to perform any other tasks to facilitate performance of computer-implemented services. Different data sources of data sources 100 may facilitate similar and/or different computer-implemented services. For example, data sources 100 may include training data sources 100A, prompts 100B, knowledge data sources 100C, and/or other sources of data usable to facilitate operation of inference models.

Training data sources 100A may include any number of data sources that provide training data for training of inference models. Training data sources 100A may include sources of raw data, processed data (e.g., curated data), and/or other types of data usable to train (e.g., retrain, fine-tune) the inference models. Refer to the discussion of FIG. 2A for more information regarding training of inference models.

Prompts 100B may include any volume and/or type of data for processing by the inference models. For example, prompts 100B may include any number of prompts obtained from consumers of inferences generated by the inference models (e.g., individuals, computers). Prompts 100B may include unstructured data and may be used, at least in part, to generate ingest data for inference models. For example, prompts 100B may include instances of ontology terms, and may undergo preprocessing to obtain sufficient context data for generating adequate ingest data. Refer to the discussion of FIGS. 2A-2B for more information regarding prompt preprocessing.

Knowledge data sources 100C may include any number and/or type of data sources that provide context data for prompts 100B. Knowledge data sources 100C may include a data source designated as a source of true data by an operator of inference models. Knowledge data sources 100C may be managed by the operator and/or another entity. For example, knowledge data sources 100C may include information regarding ontology terms included in ontology definitions defined by the operator and/or an organization of the operator, and may be queried during preprocessing of a prompt of prompts 100B (e.g., during a retrieval process). Refer to the discussion of FIGS. 2B-2C for more information regarding use of knowledge data sources 100C.

Data sources 100 may include data repositories (e.g., training data repositories and/or knowledge data repositories, not shown), and may provide data to (e.g., allow access to data by) inference model manager 104.

Downstream consumers 102 may include any number and/or type of downstream consumers. For example, downstream consumers 102 may include individuals, organizations, and/or computers. Downstream consumers 102 may consume all, or a portion of the computer-implemented services. For example, downstream consumers 102 may include users of the managed data processing systems.

Downstream consumers 102 may consume all, or a portion of the inferences and/or output from downstream processes that use the inferences. For example, downstream consumers 102 may generate and/or provide prompts of prompts 100B (e.g., portions of ingest data) for processing by the inference models, and may consume inferences generated by the inference models (e.g., in response to the ingest data) and/or output from the downstream processes that use the inferences. The inferences and/or output from the downstream processes may be used by downstream consumers 102 to improve decision-making and/or to automate tasks. For example, downstream consumers 102 may make decisions and/or initiate actions for managing operation of the data processing systems.

Inference model manager 104 may include any number of data processing systems and may manage any number of inference models. Inference model manager 104 may perform tasks relating to management of and/or facilitation of use of the inference models. For example, inference model manager 104 may manage (e.g., facilitate) (i) training processes for the inference models, (ii) preprocessing of prompts for the inference models, (iii) inferencing processes using the inference models (e.g., and the preprocessed prompts), (iv) downstream processes that use inferences obtained using the inference models, and/or (v) distribution of the inferences and/or output derived from the inferences to downstream consumers 102. Refer to the discussion of FIG. 2A for more details regarding operation of inference models.

To increase a likelihood of providing adequate ingest data to the inference models, inference model manager 104 may (i) obtain a prompt for an inference model (e.g., from prompts 100B), (ii) identify instances of ontology terms that are present in the prompt to obtain an ontology term set, (iii) perform a first retrieval process for the prompt to obtain first context data from a primary tier of a knowledge data source, (iv) analyze the first context data based on ontology definitions to identify instances of ontology terms present in the prompt for which the context data does not meet sufficiency criteria, (v) perform a second retrieval process for the prompt to obtain second context data from a secondary tier of the knowledge data source, and/or (vi) obtain ingest data based on the prompt, and/or the context data (e.g., first context data and/or second context data) obtained during any of the performed retrieval processes. Refer to the discussion of FIG. 2B for an example of an ontology-based iterative retrieval process.

To facilitate management of operation of the data processing systems using inference models, inference model manager 104 may (i) use the ingest data to obtain a response (e.g., an inference) from an inference model, and/or (ii) use the response to provision desired computer-implemented services (e.g., distribute the response to downstream consumers 102 and/or by provide the response to downstream processes).

Figure 2A:
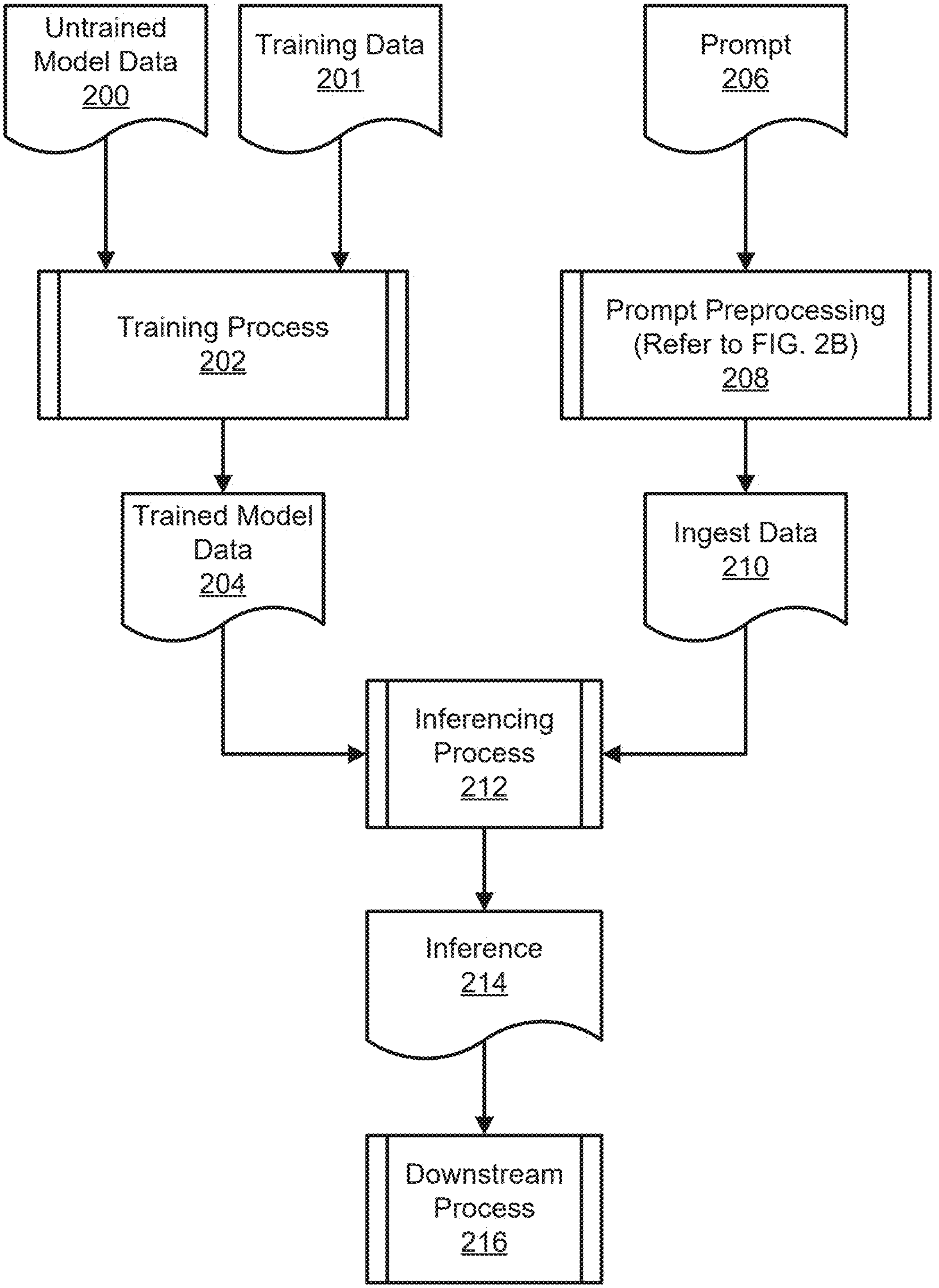
FIGS. 2A-2D show data flow diagrams in accordance with an embodiment.
Figure 2B:
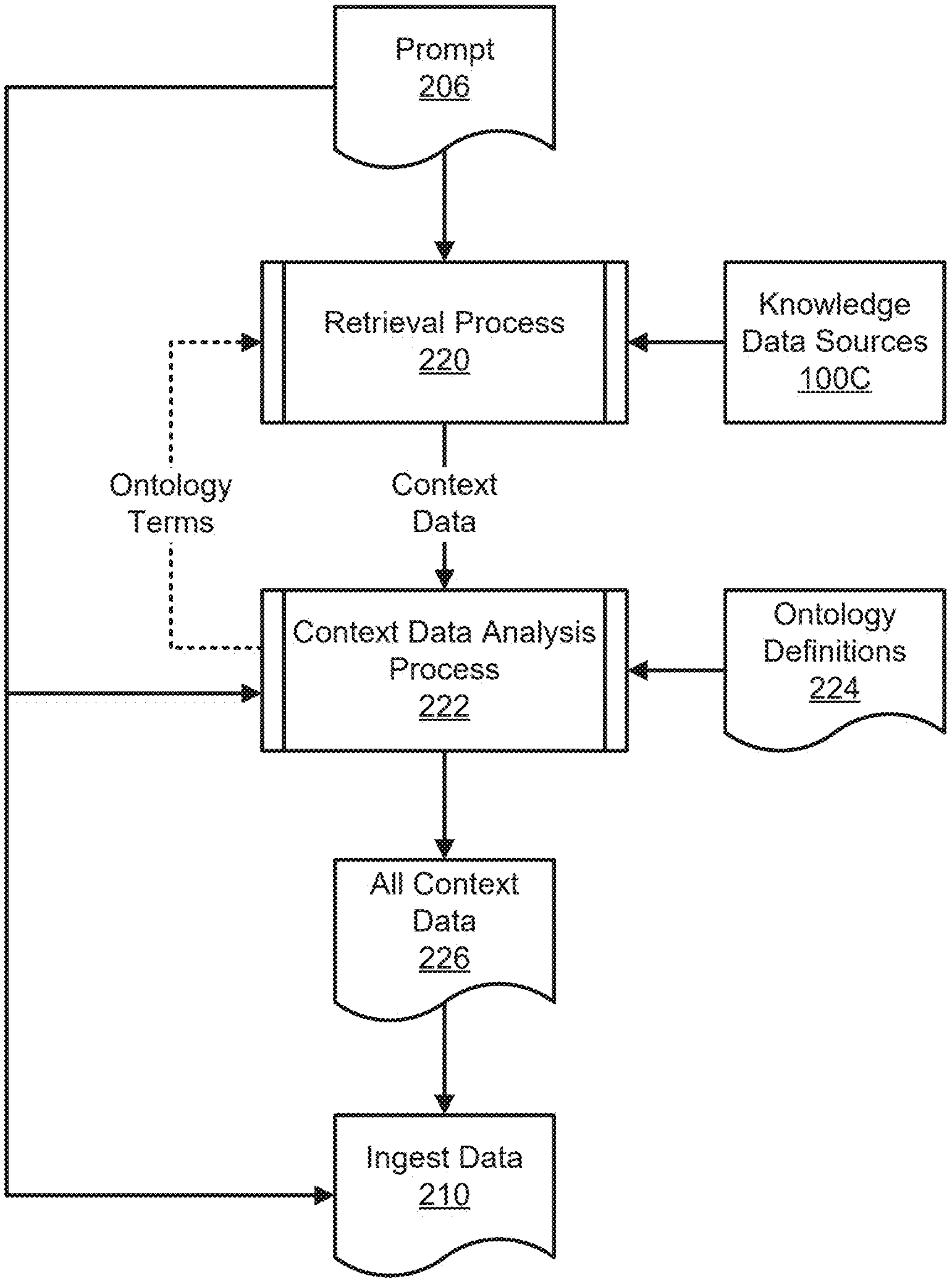
Figure 2C:
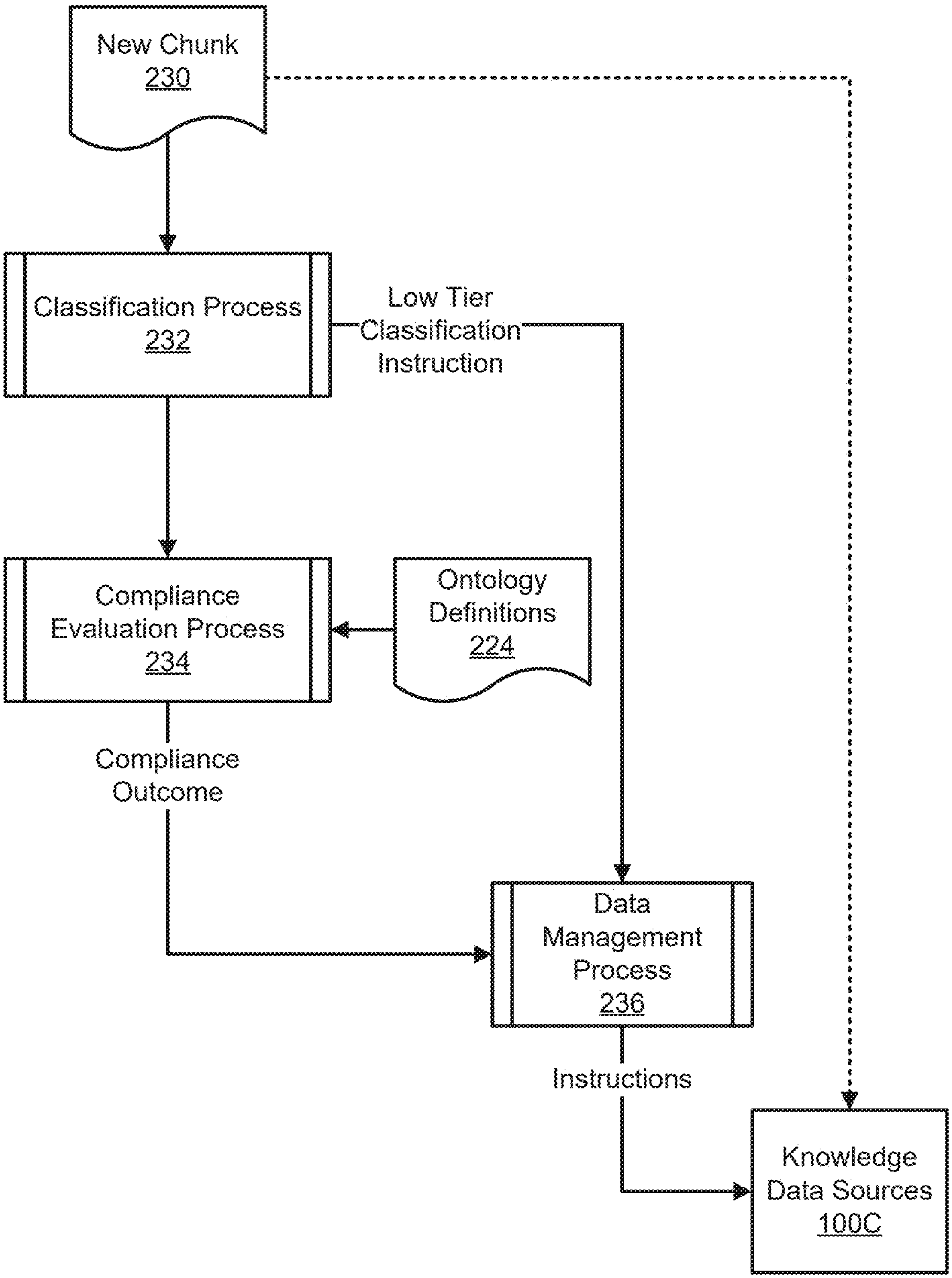
Figure 2D:
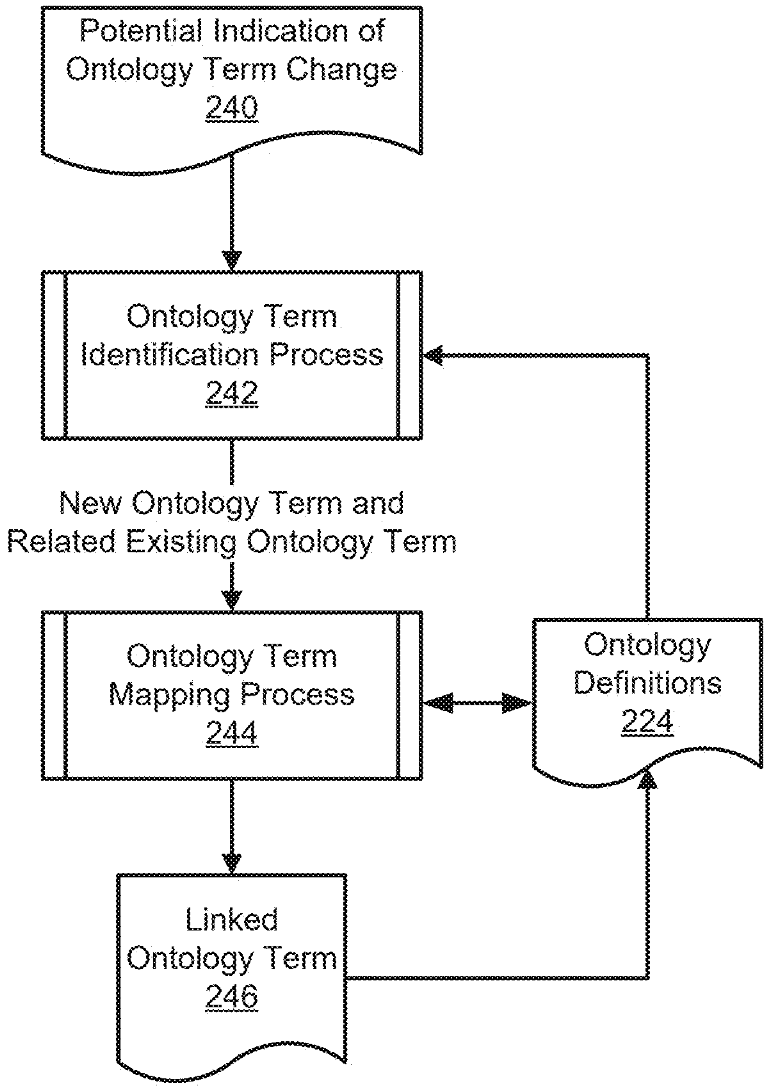
Figure 3:
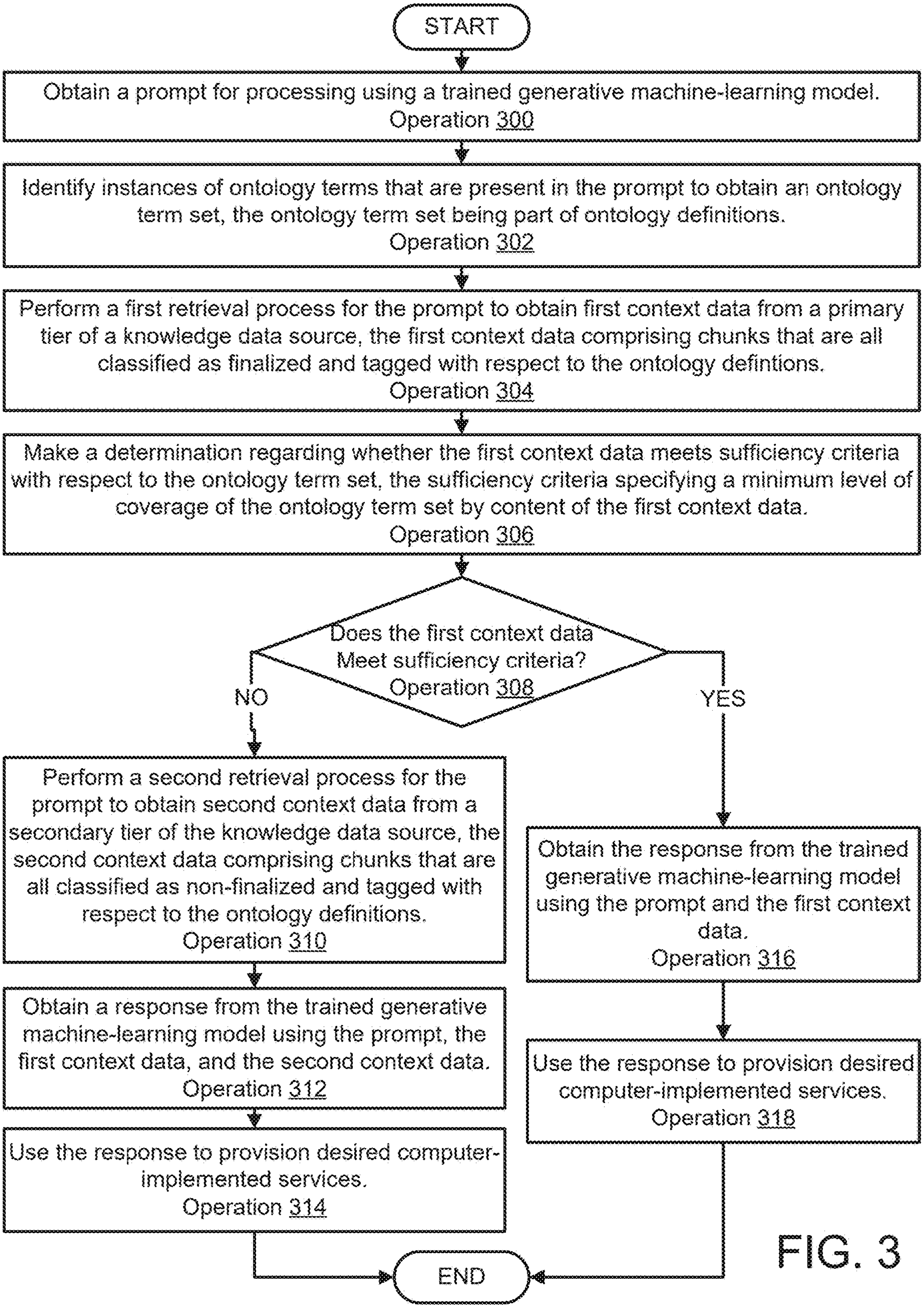
FIG. 3 shows a flow diagram illustrating a method in accordance with an embodiment.

When providing their functionality, any of data sources 100, downstream consumers 102, inference model manager 104, and/or components thereof may perform all, or a portion of the actions and methods illustrated in FIGS. 2A-3.

Any of data sources 100, downstream consumers 102, and inference model manager 104 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., smartphone), an embedded system, local controllers, an edge node, and/or any other type of data processing device or system. For additional details regarding computing devices, refer to the discussion of FIG. 4.

Any of the components illustrated in FIG. 1 may be operably connected to each other (and/or components not illustrated) with communication system 106. Communication system 106 may facilitate communications between the components of FIG. 1. In an embodiment, communication system 106 includes one or more networks that facilitate communication between any number of components. The networks may include wired networks and/or wireless networks (e.g., and/or the Internet). The networks and communication devices may operate in accordance with any number and types of communication protocols (e.g., such as the Internet protocol).

While illustrated in FIG. 1 as including a limited number of specific components, a system in accordance with an embodiment may include fewer, additional, and/or different components than those illustrated therein.

To further clarify embodiments disclosed herein, data flow diagrams in accordance with an embodiment are shown in FIGS. 2A-2D. In the diagram, flows of data and processing of data are illustrated using different sets of shapes. A first set of shapes (e.g., 200, 201) is used to represent data structures, a second set of shapes (e.g., 202, 212) is used to represent processes performed using and/or that generate data, and a third set of shapes (e.g., 100C) is used to represent sources of data.

Turning to FIG. 2A, a first data flow diagram in accordance with an embodiment is shown. The first data flow diagram may illustrate data used in and data processing performed when facilitating operation of an inference model. For example, the inference model may be used to manage operation of a data processing system.

In the example shown in FIG. 2A, operation of the inference model may include a training process and an inferencing process. The training process may include, for example, initial training of an (untrained) inference model, retraining of an inference model, and/or fine-tuning of an inference model. The inferencing process may include, for example, obtaining inferences using a trained inference model.

To obtain a trained inference model, a management entity (e.g., inference model manager 104) may facilitate performance of training process 202. Training process 202 may include training an untrained inference model defined by untrained model data 200.

Untrained model data 200 may include information relating to model architecture, hyperparameters, and/or other information regarding an untrained inference model (e.g., optimization algorithm information, hidden layer information, bias function descriptions, activation function descriptions, etc.). An inference model type and/or size may be selected based on performance goals and/or constraints, training data availability and/or quality, budget, timeline, etc. For example, the inference model may include a probabilistic model such as a generative machine-learning model (e.g., a large language model).

During training process 202, untrained model data 200 may be updated using training data 201. Training data 201 may be obtained from any number of data sources (e.g., training data sources 100A). For example, if the inference model is being trained to manage security for a data processing system, then the training data may include a corpus of information regarding types of security threats to the data processing system, labeled with actions for responding to the types of security threats (e.g., actions for reconfiguring security settings of the data processing system accordingly). As the inference model is exposed to large numbers of relationships and/or patterns in training data 201, weights and/or other parameters of untrained model data 200 may be modified to obtain trained model data 204.

Trained model data 204 may include inference model data (e.g., information regarding the architecture and/or hyperparameters of the inference model) and/or model parameter values of the inference model (e.g., weights). Trained model data 204 may be used during an inferencing process to generate inferences in response to ingest data, such as ingest data 210.

Ingest data 210 may include a portion of data for which an inference is desired to be obtained. For example, ingest data 210 may include prompt 206 (e.g., of prompts 100B). Prompt 206 may be obtained, for example, from a consumer of inferences and may include instances of ontology terms. To obtain ingest data 210 (e.g., an enhanced version of prompt 206), prompt 206 may undergo prompt preprocessing 208. For example, during prompt preprocessing 208, context data for ontology terms present in prompt 206 may be obtained, and ingest data 210 may be generated based on prompt 206 and/or the context data. Refer to the discussion of FIG. 2B for more details regarding prompt preprocessing and/or obtaining ingest data 210.

Ingest data 210, along with trained model data 204, may be provided to inferencing process 212. During inferencing process 212, a trained inference model may be obtained based on information (e.g., node information, weight information, connection information, activation functions, attention mechanisms, etc.) included in trained model data 204. Ingest data 210 may not include labeled data and, thus, an association for ingest data 210 may not be known. During inferencing process 212, the trained inference model (e.g., a trained generative machine-learning model) may read ingest data 210 and respond with an output likely to be associated with the input (e.g., the trained inference model may generate an inference).

For example, ingest data 210 may include information regarding malicious code being executed by a component of a data processing system, and inference 214 may include actions for updating security settings of the data processing system that are likely to mitigate an outcome of the execution of the malicious code according to relationships and/or patterns learned by the inference model during training process 202. Inference 214 may be used to provision computer-implemented services. For example, inference 214 may be provided to downstream process 216, and downstream process 216 may include delivery of inference 214 to a downstream consumer (e.g., as a computer-implemented service), and/or further processing of inference 214.

For example, downstream process 216 may include any type of process for updating operation of the data processing system based on inference 214. For example, downstream process 216 may include a policy enforcement process, wherein security policies for the data processing system are enforced based on information included in inference 214 (e.g., actions, security and/or configuration settings) in order to mitigate outcomes associated with the execution of the malicious code. For example, operation of the data processing system may be updated to prevent access to sensitive data, to prevent network communication via components of the data processing system, and/or to disable operation of portions of components of the data processing system.

Although described with respect to security of the data processing system, it will be appreciated that the inference models may be trained and used to update operation of the data processing system in various capacities without departing from the embodiments disclosed herein. For example, the operation of the data processing system may be updated to improve user experience, to manage failures of components of the data processing system, to improve efficient allocation of resources (e.g., computing and/or power resources), and/or to meet other operational goals for the data processing system.

Thus, using the data flows shown in FIG. 2A, operation of a data processing system may be managed based on inferences generated by trained inference models. By doing so, operation of the data processing systems may be updated timely, and the data processing systems may be more likely to operate in a desired manner.

However, a quality (e.g., usability, reliability) of the inferences generated by the trained inference models may depend on a quality of ingest data to the trained inference models. Therefore, to increase a likelihood of the ingest data being of expected quality (e.g., having adequate informational content), ontology terms included in prompts for the trained inference models may be contextualized. Methods for obtaining context data for the prompts may be discussed with respect to FIG. 2B.

Turning to FIG. 2B, a second data flow diagram in accordance with an embodiment is shown. The second data flow diagram may illustrate data used in and data processing performed when obtaining ingest data for an inference model. FIG. 2B may be an example of prompt preprocessing 208 of FIG. 2A.

To obtain the ingest data, context data for prompt 206 may be retrieved from knowledge data sources 100C. Prompt 206 may include a submission to be processed by a trained inference model to facilitate provisioning of desired computer-implemented services by a data processing system. For example, prompt 206 may include information regarding operation of the data processing system.

To obtain the context data for prompt 206, retrieval process 220 may be performed. Retrieval process 220 may include any type of process(es) wherein information (e.g., terms) present in a prompt is identified, and additional information is retrieved from a data source based on the identified information. For example, retrieval process 220 may implement information retrieval methods used during type of retrieval-augmented generation process. During retrieval process 220, a prompt (e.g., prompt 206) may be obtained and used to generate a query (e.g., a keyword search query). The query may include, for example, search terms, search parameters, and/or other information. The query may then be used to search an external data source such as knowledge data sources 100C to identify responsive portions of data stored by the external data source.

As discussed with respect to FIG. 1, knowledge data sources 100C may include a data source designated as a source of true (e.g., trusted, reliable, relevant to a subject area) data by an operator of the inference model. For example, knowledge data sources 100C may include a number of chunks of data that are tagged to associate each of the number of chunks of data with ontology terms (and/or other searchable terms).

In one or more embodiments, knowledge data sources 100C may be divided into tiers and the search process may primarily focus on the primary tier and may revert to utilizing a secondary tier should the sufficiency criteria not be met in context data analysis process 222. Refer to FIG. 2C for additional information regarding classification of chunks of data in different tiers of knowledge data sources 100C.

During a first performance of retrieval process 220, an original query may be generated based on prompt 206 (e.g., during the first performance of retrieval process 220, ontology terms may not be obtained from context data analysis process 222 as indicated by a respective arrow drawn in dashing). The original query may be derived from terms (e.g., words and/or phrases) present in prompt 206. The original query may be serviced using a deterministic process (e.g., using a trained deterministic inference model and/or any process that returns the same results for repeated servicing of the original query). For example, the original query may be used to identify portions of data responsive to the search terms and using the search parameters and/or instructions included in the original query from knowledge data sources 100C.

The identified portions of data responsive to the original query may then be ranked for relevance using a relevance ranking algorithm. Some number (e.g., best hits) of the ranked portions of data may then be selected for use as the context data. However, due to limitations of the relevance ranking algorithm and/or selection criteria, the selected context data may lack context for some terms present in the prompt such as those defined by ontology definitions 224. Therefore, to address these limitations of retrieval process 220, context data analysis process 222 may be performed.

During context data analysis process 222, context data obtained from retrieval process 220 may be analyzed using ontology definitions 224. Ontology definitions 224 may include, for example, a list (e.g., a table) of ontology terms. As discussed with respect to FIG. 1, the ontology terms may include words and/or phrases that have been designated as having a higher degree of meaning by an operator of the inference model than other words and/or phrases not designated as having the higher degree of meaning by the operator. For example, the ontology terms may include words and/or phrases that have different definitions in different subject areas.

In addition, ontology definitions 224 may include equivalence mapping of ontology terms (e.g., identifying ontology terms as equivalent). For example, the ontology terms may include different words and/or phrases that have a similar definition and/or degree of meaning by the operator and as such, those ontology terms may be recognized as equivalent terms. Consequently, when performing context data analysis process 222, ontology terms associated (e.g., via mapping) with other ontology terms may be evaluated as equivalent terms. Refer to FIG. 2D for additional information regarding ontology term mapping processes.

During context data analysis process 222, first context data obtained from the first retrieval process may be evaluated to determine whether the first context data meets sufficiency criteria. The sufficiency criteria may specify a minimum level of content of context data with respect to ontology definitions 224. For example, instances of ontology terms specified by ontology definitions 224 that are present in prompt 206 may be identified, and levels of content of the first context related to each instance of the ontology terms may be identified. The levels of content may be compared to the minimum level of content to identify any instances of ontology terms for which the first context data does not meet the sufficiency criteria.

For example, the minimum level of coverage of the ontology term set by content may specify, for each ontology term of ontology definitions 224 present in prompt 206, (i) a minimum number of words related to the respective ontology terms, (ii) a minimum number of chunks of data in the first context data that are tagged as related to the respective ontology terms, and/or (iii) a combination thereof.

The sufficiency criteria for the context data may be defined by policies. For example, the policies may specify a reduced number of ontology terms present in prompt 206 that are required to satisfy the minimum level of content, and/or an increased number of terms (e.g., other ontology terms defined by ontology definitions 224, other terms not defined by ontology definitions 224) beyond the ontology terms present in prompt 206 that are required to satisfy the minimum level of content. Any instances of ontology terms identified as present in prompt 206 that are not associated with context data satisfying at least the minimum level of content may be identified during context data analysis process 222.

If the first context data meets the sufficiency criteria for all ontology terms present in prompt 206, then the first context data may be included in all context data 226. However, if at least one instance of an ontology term may be identified for which the first context data does not meet the sufficiency criteria, then at least a portion of the first context data may be included in all context data 226 (e.g., the portion of the first context data that meet the sufficiency criteria).

In a first example, the at least one instance of the ontology term (e.g., shown as "ontology terms" in FIG. 2B) having insufficient context data may be provided to retrieval process 220 to initiate a second (iteration of) retrieval process 220 (e.g., ontology terms for which sufficient context data has been retrieved may not be included in the ontology terms provided to retrieval process 220.

In a second example, the ontology terms provided to retrieval process 220 may include all ontology terms identified in prompt 206, and each of the ontology terms may be tagged (e.g., via updating metadata) to indicate whether sufficient context data has been retrieved for each of the ontology terms. For example, the ontology term associated with the identified at least one instance may be tagged as being associated with insufficient context data, while other ontology terms may be tagged as being associated with sufficient context data.

Note that the arrow indicating the ontology terms are provided to retrieval process 220 is drawn in dashing to indicate that under some conditions the ontology terms may not be provided to retrieval process 220 (e.g., during a first iteration of retrieval process 220 and/or during subsequent iterations of retrieval process 220 when retrieved context data meets the sufficiency criteria for all ontology terms present in prompt 206).

During the second retrieval process, a revised query may be derived using the ontology terms obtained from context data analysis process 222. For example, the revised query may only include ontology terms that are tagged as associated with insufficient context data. The revised query may include a reduced number of ontology terms specified by the ontology definitions when compared to a number of ontology terms specified by the original query. The reduced number of ontology terms may include the ontology term (e.g., for which the at least one instance of the ontology term was identified), and may exclude a second ontology term of ontology definitions 224 for which an instance of the second ontology term is present in prompt 206 and for which the first context data meets the sufficiency criteria (e.g., the second ontology term having been included in the original query).

Consider a security example where a prompt, "Program A is being executed by component C of data processing system D, using resources Q, and is accessing file F", is provided to retrieval process 220. During the first retrieval process, "A", "C", "D", and "F" may include ontology terms specified by ontology definitions 224. The ontology terms may be identified and used to obtain the original query. Therefore, the original query may include 4 ontology terms specified by ontology definitions 224.

During the first retrieval process, knowledge data sources 100C may return sufficient context data for "A" "C", and "D", but not "F". Therefore, during context data analysis process 222, "F" may be identified as not being associated with at least the minimum level of content specified by the sufficiency criteria. Therefore, context data analysis process 222 may provide a data package including "F" (and excluding "A", "C", and "D", for which sufficient context data has already been obtained) to retrieval process 220, and a second retrieval process may be performed. The second retrieval process may use a revised query that includes 1 ontology term specified by ontology definitions 224 (e.g., "F").

Returning to the second retrieval process, the revised query may be used to retrieve second context data from knowledge data sources 100C. By using the revised query, the search algorithm used during retrieval process 220 may be more likely to rank and select sufficient context data for the ontology terms included in the revised query compared to when using the original query.

The second context data may be provided to context data analysis process 222, and a determination may be made regarding whether the second context data meets the sufficiency criteria. If the second context data meets the sufficiency criteria, then the second context data may be included in all context data 226. However, if the second context data does not meet the sufficiency criteria, then at least a portion of the second context data may be included in all context data 226, and context data analysis process 222 may be performed to identify ontology terms for which the second context data is insufficient. Iterations of retrieval process 220 and/or context data analysis process 222 may be performed until all context data 226 meets the sufficiency criteria for each instance of ontology terms present in prompt 206.

All context data 226 may include context data retrieved during any number of iterations of retrieval process 220. All context data 226 may be used, in part, to obtain ingest data 210. For example, ingest data 210 may include all context data 226 (e.g., the first context data and/or the second context data) and/or prompt 206. Ingest data 210 may be provided to an inferencing process so that a response (e.g., an inference) may be obtained using a trained inference model. For example, ingest data 210 may be provided to inferencing process 212 of FIG. 2A.

Returning to the security example, the response obtained from the inference model (e.g., inference 214 in FIG. 2A) during the inferencing process may indicate that program A is likely to include malicious code, and that file F is not expected to be accessed by program A during desired operation of data processing system D. The response may indicate that a security policy for data processing system D should be enforced (e.g., which may occur during downstream process 216 of FIG. 2A).

Thus, using data flows shown in FIG. 2B, a quality of ingest data to inference models may be improved using context data obtained via an iterative retrieval process. The iterative retrieval process may be more likely to produce sufficient context data for instances of ontology terms present in prompts submitted for processing by the inference models. By doing so, inferences obtained based on the ingest data may be more likely to be reliable for managing operation of data processing systems, and the data processing systems may be more likely provide desired computer-implemented services.

Turning to FIG. 2C, a third data flow diagram in accordance with an embodiment is shown. The third data flow diagram may illustrate data used in and data processing performed when managing the integration of a new document (e.g., new chunk 230) into knowledge data sources 100C.

To manage the integration of a new document (e.g., new chunk 230) into knowledge data sources (e.g., knowledge data sources 100C), new chunk 230 may be obtained. New chunk 230 may be obtained from various data sources, for example, by a user (e.g., subject matter expert), an automated system, etc. New chunk 230 may represent a new chunk of data to be classified, evaluated, and stored appropriately in knowledge data sources 100C.

New chunk 230 may be used during classification process 232 to classify new chunk 230 with respect to status of completion. During classification process 232, new chunk 230 may be analyzed to determine the status of the new chunk of data. For example, new chunk 230 may be analyzed using any classification process (e.g., manual tagging by a subject matter expert, tagging based on predefined rules or natural language processing via an automated process, etc.).

New chunk 230 may be classified (e.g., tagged), for example, as "experimental" (e.g., non-final or incomplete) or as "non-experimental" (e.g., final or complete). For example, a subject matter expert may analyze the lifespan of a new document (e.g., new chunk 230) and compare it to a lifetime threshold that is presumed by the subject matter expert to be sufficient time to establish the document as complete. If the lifespan of the new document does not meet the lifetime threshold (e.g., insufficient amount of time has passed since the creation of the new document), the subject matter expert may classify the new document (e.g., new chunk 230) as "experimental".

In addition, classification of new chunk 230 may be based on indications of the new chunk being associated with an official source (e.g., official architecture documents, published standards, etc.). For example, new chunk 230 may be classified as "non-experimental" if metadata associated with new chunk 230 indicates an official source (e.g., authorized user and/or author) provided the new chunk. Conversely, if the data (e.g., new chunk 230) originates from informal sources (e.g., draft documents, exploratory work, etc.), new chunk 230 may be classified as "experimental".

New chunk 230 may also be classified as "experimental" or "non-experimental" based on modification rate to the new chunk 230. The modification rate may include a rate in which edits to the data occur, which may represent a stability indicator of the data. For example, if new chunk 230 is subject to frequent updates, revisions, and/or modifications, new chunk 230 may be indicated instable and/or that the data is an experimental phase (e.g., new chunk 230 may be tagged as "experimental"). Conversely, a lower frequency of modifications or no recent changes may indicate that new chunk 230 has reached a stable state and may be ready for official use (e.g., new chunk 230 may be tagged as "non-experimental").

If new chunk 230 is classified as experimental, low tier classification instruction may be obtained and used during data management process 236 to manage new chunk 230 so that the new chunk is routed to a low tier storage in knowledge data sources 100C.

Conversely, if the lifespan of the new document meets the lifetime threshold (e.g., sufficient amount of time has passed since the creation of the new document), the subject matter expert may classify the new document (e.g., new chunk 230) as "non-experimental". If new chunk 230 is classified as non-experimental (e.g., tagged as final/complete), evaluation of compliance of new chunk 230 may be performed. New chunk 230 and/or any information obtained during classification process 232 may be used during compliance evaluation process 234.

Compliance evaluation process 234 may be performed to evaluate new chunk 230 compliance with respect to ontology definitions 224. While described with respect to ontology, it will be appreciated that other types of compliance requirements may be used in compliance evaluation process 234.

During compliance evaluation process 234, new chunk 230 may be analyzed using ontology definitions 224 to identify any occurrence of errors and/or issues with ontology terms. Compliance evaluation process 234 may include any type of process(es) wherein information (e.g., tags, metadata, and/or other information) of a chunk of data (e.g., new chunk 240) is identified and evaluated based on additional information (e.g., terms) present in the chunk of data (e.g., new chunk 240). For example, compliance evaluation process 234 may be performed to identify whether tags associated with new chunk 230 properly reflect the content of new chunk 230 (e.g., terms present in the new chunk of data).

During compliance evaluation process 234, new chunk 230 may be analyzed using natural language processing and/or large language model to identify whether tags (e.g., metadata describing the chunk of data) ascribed to new chunk 230 relate to the content (e.g., ontology terms and/or other searchable terms) of new chunk 230. For example, new chunk 230 may include a document regarding information on different types of machine learning (e.g., supervised learning, unsupervised learning, and/or semi-supervised learning). If tags associated with new chunk 230 include "machine learning" and/or "artificial intelligence", new chunk 230 may be identified as properly tagged and new chunk 230 may be determined to be in compliance with ontology definitions 224.

Conversely, if tags associated with new chunk 230 include "rule-based system" and/or "graphic user interface designs", new chunk 230 may be identified as improperly tagged and new chunk 230 may be determined to not be in compliance with ontology definitions 224.

As a result of performing compliance evaluation process 234, compliance outcome may be obtained. The compliance outcome may indicate whether new chunk 230 is complaint. For example, if the chunk fails compliance evaluation, instructions may be generated to reject the chunk from integration into knowledge data sources 100C and/or provide feedback for remediation (e.g., to correct tagging errors or refine ontology terms). For example, data chunk 230 (e.g., a new document and/or a portion of data of the new document) may be temporally rejected from storing in knowledge data sources 100C and a notification indicating remediation actions for the incompliant data chunk 230 may be provided to a user (e.g., via a graphical user interface hosted by a data processing system). Conversely, if the chunk passes compliance evaluation process, for example, the compliance outcome may indicate new chunk 230 is to be stored in a primary tier of the knowledge data source.

Data management process 236 may be performed to generate instructions for managing the integration and storage of data chunk 230 based on the outcomes of classification process 232 and/or compliance evaluation process 234. During data management process 236, information obtained during classification process 232 (e.g., low tier classification instruction) and/or information obtained during compliance evaluation process 234 (e.g., compliance outcome) may be ingested and used to generate the instructions for knowledge data sources 100C to ensure proper handling of new chunk 230.

The instructions may include: (i) storage tier destination for new chunk 230, (ii) rejection of storage of new chunk 230 in any tiers of knowledge data sources 100C, and/or (iii) information for initiating remediation processes to resolve compliance issues. For example, the instructions may determine the appropriate tier (e.g., primary tier or secondary tier of knowledge data sources 100C) for storing new chunk 230 or whether new chunk 230 should be rejected.

Note that the arrow indicating new chunk 230 is drawn in dashing to indicate that under some conditions new chunk 230 may not be provided to knowledge data sources 100C (e.g., during data management process 236 when instructions associated with new chunk 230 indicate rejection of the new chunk based on compliance failure).

Turning to FIG. 2D, a fourth data flow diagram in accordance with an embodiment is shown. The fourth data flow diagram may illustrate data used in and data processing performed when obtaining and/or updating ontology definitions used to obtain context data. FIG. 2D may be an example of updating ontology definitions 224 of FIG. 2B.

To obtain ontology definitions (e.g., ontology definitions 224), potential indication of ontology term change 240 may be identified. Potential indication of ontology term change 240 may include at least one of the ontology terms used to tag a data chunk being equivalent to another ontology term. Potential indication of ontology term change 240 may be identified, for example, via user input (e.g., a subject matter expert) and/or automated processes. For example, a subject matter expert may indicate a potential change to an ontology term (e.g., previously defined in ontology definitions 22) and provide instructions (e.g., via user input) defining the change to the ontology term (e.g., ascribed new definition). As a secondary example, an automated analysis of context data may be performed to identify patterns regarding ontology terms (e.g., repeated terms, new terminology, etc.) and/or ontology terms that may not be included in the ontology definitions. For example, an automated system may analyze context data (e.g., similar to context data obtained from performing retrieval process 220) and may identify a heavily repeated term within the context data. Potential indication of ontology term change 240 may be used in ontology term identification process 242.

During ontology term identification process 242, potential indication of ontology term change 240 may be analyzed to identify whether the ontology term is a new term (e.g., term not present in ontology definitions 224) and/or determine if there is a relationship to existing terms (e.g., terms present in ontology definitions 224). For example, the ontology term indicated as a potential change (e.g., specified by potential indication of ontology term change 240) may be analyzed and used in any type of comparison process with ontology definitions 224.

For example, if the potential change to an ontology term is provided by a subject matter expert, the user input including the instructions may be read and interpreted to identify a new ontology term (and/or the meaning of the new ontology term ascribed by the subject matter expert) and/or any connections to existing terms present in ontology definitions 224. The new ontology term and the related existing ontology term may be used during ontology term mapping process 244 to map the newly identified ontology term(s) to existing ontology definitions for integration.

During ontology term mapping process 244, the new ontology term, the related existing ontology term, and/or any information obtained from ontology term identification process 242 may be used in any type of analysis process in order to establish a relationship between the new ontology term and the related existing ontology term. Consider a security related example, where ontology definitions 224 may include the term "firewall rules", which may represent the rules for allowing or blocking traffic through a firewall. A new ontology term, "adaptive firewall policies" may be identified via an automated analysis of context data (e.g., system logs and/or reports). During ontology term mapping process 224, a relationship may be established between the new ontology term, "adaptive firewall policies" and existing ontology terms (e.g., "firewall rules" and/or any other existing ontology terms).

To do so, the new ontology term and any associated metadata, such as the context in which the new ontology term was identified (e.g., log files, subject matter expert instructions, etc.) may be analyzed. For example, attributes of the new ontology term (e.g., meaning, usage frequency, etc.) may be compared to attributes of existing ontology terms.

As previously described above, ontology definitions 224 may include, for example, a list (e.g., a table) of ontology terms. Existing ontology definitions (e.g., 224) may be used to identify existing ontology terms that may be relevant to the new ontology term. Once the related existing ontology term(s) are identified, the relationship between the new ontology term and the related existing ontology term(s) may be established.

To do so, the type of relationship between the related existing ontology term(s) and the new ontology term may be identified. For example, the relationships may include a hierarchical relationship (e.g., a new term may be a subcategory of an existing term, an equivalence relationship (e.g., the new term may be a synonym or replacement of an existing term), an association-type of relationship (e.g., the new term may be conceptually related to an existing term but may not belong to the same category), and/or any other type of relationship.

For example, in a hierarchical relationship, the related existing ontology term, "firewall rules" may be identified as the parent term and the new ontology term, "adaptive firewall policies" may be identified as a child term under the broader category of "firewall rules".

As a result of performing ontology term mapping process 244, ontology definitions 224 may be updated to map the related existing ontology term to the new ontology term and linked ontology term 246 may be obtained.

Linked ontology term 246 may be provided to ontology definitions 224 to update the ontology terms to include the linking of the new ontology term and the related existing ontology term. For example, linked ontology term 246 may be used to integrate the new ontology term into the ontology definitions 224 while maintaining the connection to related terms (e.g., existing ontology terms in definitions 224). Continuing the above example, the new ontology term, "adaptive firewall policies", may be linked to the related existing ontology term, "firewall rules" in ontology definitions 224.

Thus, using data flows shown in FIG. 2D, new ontology terms may be identified and mapped to related existing ontology terms provided by ontology definitions. As such, the ontology definitions may be updated as modifications to ontology terms occur. By doing so, the context data obtained via a retrieval process may be more likely to include relevant information.

Any of the processes illustrated using the second set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor based devices (e.g., computer chips).

Any of the data structures illustrated using the first set of shapes may be implemented using any type and number of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

Turning to FIG. 3, a flow diagram illustrating a method in accordance with an embodiment is shown. The flow diagram may illustrate various operations performed while managing operation of a data processing system.

At operation 300, a prompt may be obtained for processing using a trained generative machine-learning model. The prompt may be obtained by methods described with respect to FIG. 2B and/or by other methods. For example, the prompt may be obtained by (i) reading the prompt from storage, (ii) receiving the prompt from an external entity, and/or (iii) any other methods.

At operation 302, instances of ontology terms that are present in the prompt may be identified to obtain an ontology term set. The ontology terms may be part of ontology definitions. The instances of ontology terms that are present in the prompt may be identified by methods described with respect to context data analysis process 222 and/or by other methods. For example, the instances of ontology terms that are present in the prompt may be identified by (i) obtaining characteristics for each ontology term for which an instance is present in the prompt, (ii) obtaining ontology definitions for each of the ontology terms that is present in the prompt, and/or (iii) comparing the characteristics for each ontology term to the ontology definitions for each of the ontology terms.

At operation 304, a first retrieval process for the prompt may be performed to obtain first context data from a primary tier of a knowledge data source. The first retrieval process may be performed by methods described with respect to retrieval process 220 of FIG. 2B and/or by other methods. For example, the first retrieval process may be performed by (i) obtaining (e.g., deriving) an original query based on the prompt, (ii) using the original query to search a knowledge data source to retrieve data responsive to the original query, and/or (iii) obtaining the first context data from the primary tier of the knowledge data source based on at least a portion of the data responsive to the original query.

At operation 306, a determination regarding whether the first context data meets sufficiency criteria may be made. The determination may be made by methods described with respect to context data analysis process 222 and/or by other methods (e.g., obtaining a notification indicating whether the first context data meets the sufficiency criteria). The sufficiency criteria may specify a minimum level of coverage of the ontology term set by content of the first context data (with respect to ontology definitions. In other words, different portions of the first context data may be associated with different ontology terms specified by the ontology definitions.

Making the determination may include, for a first chunk of the first context data: (i) identifying at least one tag applied to the first chunk (e.g., the at least one tag indicating at least one of the ontology terms is covered by the chunk), (ii) identifying whether the at least one of the ontology terms is linked by the ontology definitions as being equivalent to another of the ontology terms, and the first chunk not being tagged to indicate that the first chunk covers the other of the ontology terms.

In a first instance of the determination where the first context data does not meet the sufficiency criteria with respect to the ontology definitions, the method may proceed to operation 310 following operation 308. Otherwise, in a second instance of the determination where the first context data meets the sufficiency criteria, the method may proceed to operation 316 following operation 308.

At operation 310, a second retrieval process for the prompt may be performed to obtain second context data from a secondary tier of the knowledge data source. The second context data may include chunks that are all classified as non-classified and tagged with respect to the ontology definitions. The second retrieval process may be performed by methods described with respect to FIG. 2A, operation 300, and/or by other methods. For example, the second retrieval process may be performed by (i) obtaining the ontology term, (ii) obtaining (e.g., deriving) a revised query based on the ontology term, (iii) using the revised query to search the trusted data source to retrieve data responsive to the revised query, and/or (iv) obtaining second context data based on at least a portion of the data responsive to the revised query.

At operation 312, a response from the trained generative machine-learning model may be obtained using the prompt, the first context data, and the second context data. The response may be obtained by (i) receiving the response (e.g., from another device), (ii) reading the response (e.g., from storage), and/or (iii) generating the response. The response may be generated using methods described with respect to FIG. 2A and/or by other methods. For example, the response may be obtained by (i) obtaining (e.g., training) the trained generative machine-learning model, (ii) obtaining (e.g., generating) ingest data for the trained generative machine-learning model, and/or (iii) providing the ingest data to the trained generative machine-learning model for processing. For example, the ingest data may be obtained by generating a data package that includes the prompt, and the combination of the first context data and the second context data.

At operation 314, the response may be used to provision desired computer-implemented services. The response may be used by (i) providing the response to a downstream consumer as a first portion of the desired computer-implemented services, (ii) providing the response to a downtown process to obtain an output from the downstream process, and/or (iii) using the output from the downstream process to provision a second portion of the desired computer-implemented services.

Using the response may include updating the operation of the data processing system. For example, the response may include information regarding policies that should be enforced in order to increase a likelihood of providing the desired computer-implemented services in view of information included in the prompt, the first context data, and the second context data. Refer to the discussion of FIGS. 2A-2B for more details regarding use of the response and/or updating the data processing system.

The method may end following operation 314.

At operation 316, the response from the trained generative machine-learning model may be obtained using the prompt and the first context data. The response may be obtained by (i) receiving the response (e.g., from another device), (ii) reading the response (e.g., from storage), and/or (iii) generating the response. The response may be generated using methods described with respect to FIG. 2A and/or by other methods. For example, the response may be obtained by (i) obtaining (e.g., training) the trained generative machine-learning model, (ii) obtaining (e.g., generating) ingest data for the trained generative machine-learning model, and/or (iii) providing the ingest data to the trained generative machine-learning model for processing. For example, in the second instance of the determination at operation 308 where the first context data meets the sufficiency criteria, then the ingest data may be obtained by generating a data package that includes the prompt and the first context data.

At operation 318, the response may be used to provision desired computer-implemented services. The response may be used by (i) providing the response to a downstream consumer as a first portion of the desired computer-implemented services, (ii) providing the response to a downstream process to obtain an output from the downstream process, and/or (iii) using the output from the downstream process to provision a second portion of the desired computer-implemented services.

Using the response may include updating the operation of the data processing system. For example, the response may include information regarding policies that should be enforced in order to increase a likelihood of providing the desired computer-implemented services in view of information included in the prompt and the first context data. Refer to the discussion of FIGS. 2A-2B for more details regarding use of the response and/or updating the data processing system.

The method may end following operation 318.

Thus, as illustrated above, embodiments disclosed herein may provide systems and methods for managing context data retrieval for ingest data to inference models used to manage operation of a data processing system. By increasing a likelihood of retrieving sufficient context data, the resulting ingest data may be more likely to facilitate reliable inferencing by the inference models. As a result, the data processing system may be more likely to be updated reliably (e.g., appropriately, timely), and the computer-implemented services provided by the data processing systems may be more likely to be desired computer-implemented services.

Figure 4:
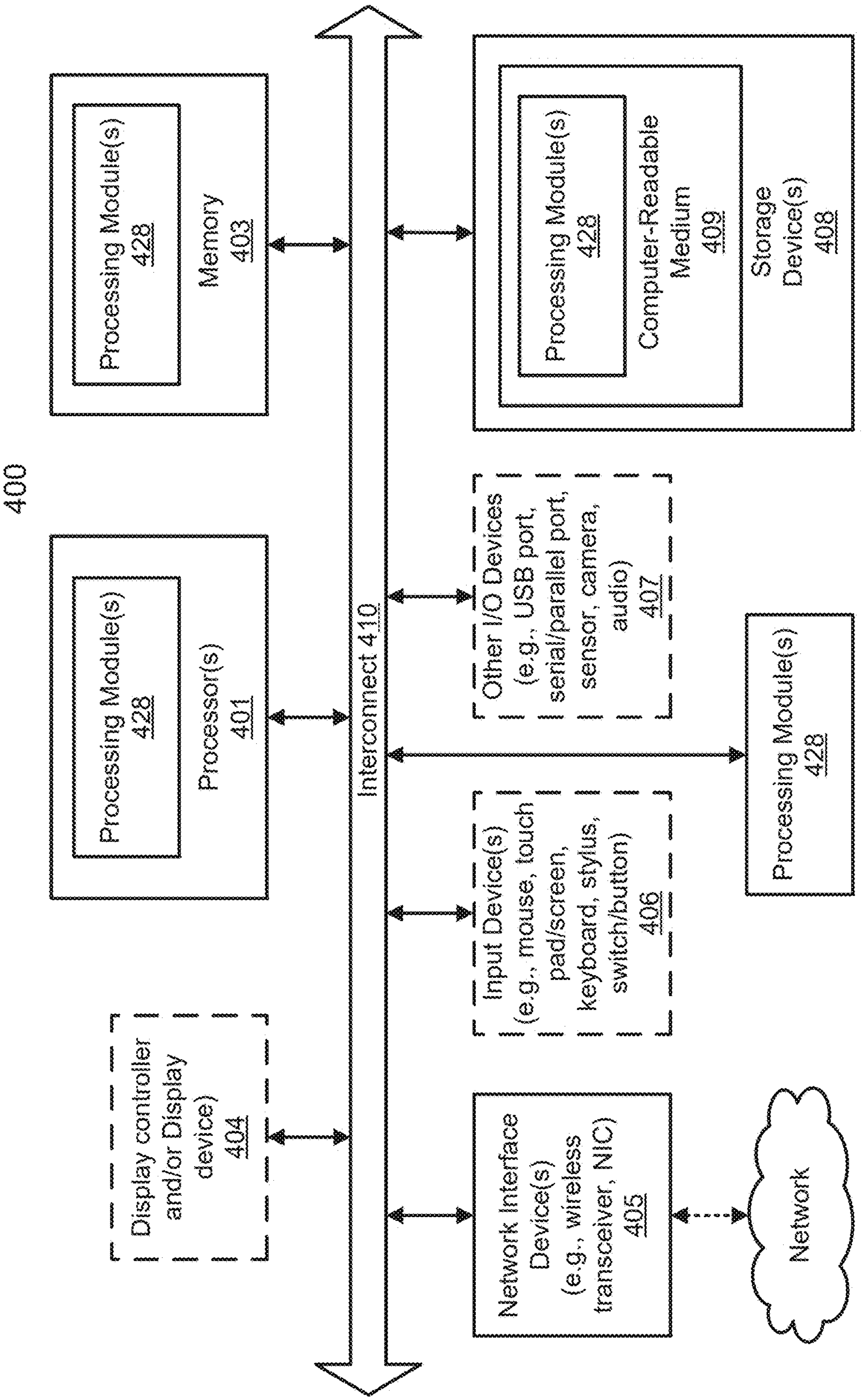
FIG. 4 shows a block diagram illustrating a data processing system in accordance with an embodiment.

Any of the components illustrated in FIGS. 1-3 may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high-level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random-access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as Vx Works.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a Wi-Fi transceiver, an infrared transceiver, a Bluetooth transceiver, a WiMAX transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid-state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also, a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above.

Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs, or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components, or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing operation of a data processing system, the method comprising:

- classifying chunks of context data into tiers that are logical demarcations of a knowledge data source based on a classification process, wherein a primary tier comprises any of the chunks that are verified as being accurately tagged, and a secondary tier comprises any of the chunks that are not verified as being accurately tagged;
- obtaining a prompt for processing using a trained generative machine-learning model;
- identifying instances of ontology terms that are present in the prompt to obtain an ontology term set, the ontology terms being part of ontology definitions;
- performing a first retrieval process for the prompt to obtain first context data from the primary tier of the knowledge data source, the first context data comprising chunks that are all classified as finalized and tagged with respect to the ontology definitions;
- making a determination regarding whether the first context data meets sufficiency criteria with respect to the ontology term set, the sufficiency criteria specifying a minimum level of coverage of the ontology term set by content of the first context data; and
- in a first instance of the determination where the first context data does not meet the sufficiency criteria:
  - performing a second retrieval process for the prompt to obtain second context data from the secondary tier of the knowledge data source, the second context data comprising chunks that are all classified as non-finalized and tagged with respect to the ontology definitions;

generating an ingest data package comprising the prompt, the first context data, and the second context data;

obtaining a response from the trained generative machine-learning model using the ingest data package, the response being based on prompt, the first context data, and the second context data; and using the response to provision desired computer-implemented services.

2. The method of claim 1, wherein making the determination comprises:

for a first chunk of the first context data:

identifying at least one tag applied to the first chunk, the at least one tag indicating at least one of the ontology terms is covered by the first chunk;

identifying whether the at least one of the ontology terms is linked by the ontology definitions as being equivalent to another of the ontology terms, and the first chunk not being tagged to indicate that the first chunk covers the other of the ontology terms; and in a first instance of the identifying where the at least one of the ontology terms is linked as being equivalent to the other of the ontology terms:

treating the first chunk as being tagged as covering both of:

the at least one of the ontology terms, and the other of the ontology terms.

3. The method of claim 1, further comprising:

in a second instance of the determination where the first context data does meet the sufficiency criteria:

obtaining the response from the trained generative machine-learning model using the prompt and the first context data; and using the response to provision desired computer-implemented services.

4. The method of claim 1, wherein the ontology term set comprises a deduplicated set of the instances of ontology terms.

5. The method of claim 1, wherein the minimum level of coverage of the ontology term set by content of the first context data specifies a number of the chunks that must be tagged as covering each of the ontology terms of the ontology term sets.

6. The method of claim 1, wherein an original query is generated based on the prompt as part of the first retrieval process.

7. The method of claim 6, wherein the original query is serviced using a deterministic process, the deterministic process returning same results for repeated servicing of the original query.

8. The method of claim 1, wherein the ontology terms are words and/or phrases that have been designated as having a higher degree of meaning by an operator of the trained generative machine-learning model than other words and/or phrases not designated as having the higher degree of meaning by the operator.

9. A non-transitory machine-readable medium having instructions stored therein, which when executed by a processor, cause the processor to perform operations for managing operation of a data processing system, the operations comprising:

classifying chunks of context data into tiers that are logical demarcations of a knowledge data source based on a classification process, wherein a primary tier comprises any of the chunks that are verified as being accurately tagged, and a secondary tier comprises any of the chunks that are not verified as being accurately tagged;

obtaining a prompt for processing using a trained generative machine-learning model;

identifying instances of ontology terms that are present in the prompt to obtain an ontology term set, the ontology terms being part of ontology definitions;

performing a first retrieval process for the prompt to obtain first context data from the primary tier of the knowledge data source, the first context data comprising chunks that are all classified as finalized and tagged with respect to the ontology definitions;

making a determination regarding whether the first context data meets sufficiency criteria with respect to the ontology term set, the sufficiency criteria specifying a minimum level of coverage of the ontology term set by content of the first context data; and in a first instance of the determination where the first context data does not meet the sufficiency criteria:

performing a second retrieval process for the prompt to obtain second context data from the secondary tier of the knowledge data source, the second context data comprising chunks that are all classified as non-finalized and tagged with respect to the ontology definitions;

obtaining a response from the trained generative machine-learning model using the prompt, the first context data, and the second context data; and using the response to provision desired computer-implemented services.

10. The non-transitory machine-readable medium of claim 9, wherein making the determination comprises:

for a first chunk of the first context data:

identifying at least one tag applied to the first chunk, the at least one tag indicating at least one of the ontology terms is covered by the first chunk;

identifying whether the at least one of the ontology terms is linked by the ontology definitions as being equivalent to another of the ontology terms, and the first chunk not being tagged to indicate that the first chunk covers the other of the ontology terms; and in a first instance of the identifying where the at least one of the ontology terms is linked as being equivalent to the other of the ontology terms:

treating the first chunk as being tagged as covering both of:

the at least one of the ontology terms, and the other of the ontology terms.

11. The non-transitory machine-readable medium of claim 9, wherein the operations further comprise:

in a second instance of the determination where the first context data does meet the sufficiency criteria:

obtaining the response from the trained generative machine-learning model using the prompt and the first context data; and using the response to provision desired computer-implemented services.

12. The non-transitory machine-readable medium of claim 9, wherein the ontology term set comprises a deduplicated set of the instances of ontology terms.

13. The non-transitory machine-readable medium of claim 9, wherein the minimum level of coverage of the ontology term set by content of the first context data specifies a number of the chunks that must be tagged as covering each of the ontology terms of the ontology term sets.

14. A system, comprising:

a processor; and a memory coupled to the processor to store instructions, which when executed by the processor, cause operations for managing operation of a data processing system to be performed, the operations comprising:

classifying chunks of context data into tiers that are logical demarcations of a knowledge data source based on a classification process, wherein a primary tier comprises any of the chunks that are verified as being accurately tagged, and a secondary tier comprises any of the chunks that are not verified as being accurately tagged;

obtaining a prompt for processing using a trained generative machine-learning model;

identifying instances of ontology terms that are present in the prompt to obtain an ontology term set, the ontology terms being part of ontology definitions;

performing a first retrieval process for the prompt to obtain first context data from the primary tier of the knowledge data source, the first context data comprising chunks that are all classified as finalized and tagged with respect to the ontology definitions;

making a determination regarding whether the first context data meets sufficiency criteria with respect to the ontology term set, the sufficiency criteria specifying a minimum level of coverage of the ontology term set by content of the first context data; and in a first instance of the determination where the first context data does not meet the sufficiency criteria:

performing a second retrieval process for the prompt to obtain second context data from the secondary tier of the knowledge data source, the second context data comprising chunks that are all classified as non-finalized and tagged with respect to the ontology definitions;

obtaining a response from the trained generative machine-learning model using the prompt, the first context data, and the second context data; and using the response to provision desired computer-implemented services.

15. The system of claim 14, wherein making the determination comprises:

for a first chunk of the first context data:

identifying at least one tag applied to the first chunk, the at least one tag indicating at least one of the ontology terms is covered by the first chunk;

identifying whether the at least one of the ontology terms is linked by the ontology definitions as being equivalent to another of the ontology terms, and the first chunk not being tagged to indicate that the first chunk covers the other of the ontology terms; and in a first instance of the identifying where the at least one of the ontology terms is linked as being equivalent to the other of the ontology terms:

treating the first chunk as being tagged as covering both of:

the at least one of the ontology terms, and the other of the ontology terms.

16. The system of claim 14, wherein the operations further comprise:

in a second instance of the determination where the first context data does meet the sufficiency criteria:

obtaining the response from the trained generative machine-learning model using the prompt and the first context data; and using the response to provision desired computer-implemented services.

17. The system of claim 14, wherein the ontology term set comprises a deduplicated set of the instances of ontology terms.

18. The method of claim 1, wherein, for a given chunk of the chunks of the context data, the classification process comprises determining that the given chunk is verified based a lifetime of the given chunk satisfying a lifetime threshold, and determining that the given chunk is not verified based on the lifetime of the given chunk not satisfying the lifetime threshold.

19. The method of claim 1, wherein, for a given chunk of the chunks of the context data, the classification process comprises determining that the given chunk is verified based on the given chunk being obtained from an authorized source, and determining that the given chunk is not verified based on obtaining the given chunk from an informal source that is not authorized.

20. The method of claim 1, wherein, for a given chunk of the chunks of the context data, the classification process comprises determining that the given chunk is verified based a modification rate of the given chunk satisfying a rate threshold, and determining that the given chunk is not verified based on the modification rate of the given chunk not satisfying the rate threshold.

* * * * *